United States Patent
Asahara et al.

(10) Patent No.: US 8,538,651 B2
(45) Date of Patent: Sep. 17, 2013

(54) DRIVING FORCE CONTROLLER OF VEHICLE

(75) Inventors: Norimi Asahara, Numazu (JP); Katsumi Kono, Shizuoka (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 896 days.

(21) Appl. No.: 11/911,203

(22) PCT Filed: Apr. 11, 2006

(86) PCT No.: PCT/JP2006/308009
§ 371 (c)(1),
(2), (4) Date: Oct. 11, 2007

(87) PCT Pub. No.: WO2006/120838
PCT Pub. Date: Nov. 16, 2006

(65) Prior Publication Data
US 2009/0069971 A1    Mar. 12, 2009

(30) Foreign Application Priority Data

Apr. 13, 2005 (JP) ................................. 2005-115804

(51) Int. Cl.
G06F 17/00 (2006.01)
G06F 19/00 (2011.01)
B60K 31/02 (2006.01)
B60T 8/32 (2006.01)

(52) U.S. Cl.
USPC .................. 701/70; 701/79; 701/84; 701/87; 701/93; 477/43; 180/178

(58) Field of Classification Search
USPC .................. 701/29, 31, 35, 36, 51, 53, 54, 55, 701/56, 58, 61, 70, 82, 93–95, 66, 79, 84–87, 701/1, 29.1, 29.2; 477/34, 43, 77, 78; 180/170, 180/178, 179, 271, 272

See application file for complete search history.

(56) References Cited

U.S. PATENT DOCUMENTS

| | | | | |
|---|---|---|---|---|
| 4,764,155 A | * | 8/1988 | Kumura et al. | ................. 474/12 |
| 5,022,285 A | * | 6/1991 | Suzuki | ............................ 477/48 |
| 5,048,631 A | * | 9/1991 | Etoh | ............................. 180/179 |
| 5,663,880 A | * | 9/1997 | Saur et al. | ........................ 701/93 |
| 6,151,542 A | | 11/2000 | Yoshino et al. | |

FOREIGN PATENT DOCUMENTS

| | | |
|---|---|---|
| DE | 199 42 446 A1 | 4/2000 |
| JP | 62 199536 | 9/1987 |
| JP | 2000-052818 | 2/2000 |
| JP | 2002 087117 | 3/2002 |
| JP | 2004 322947 | 11/2004 |

* cited by examiner

*Primary Examiner* — Thomas Tarcza
*Assistant Examiner* — Edward Pipala
(74) *Attorney, Agent, or Firm* — Oblon, Spivak, McClelland, Maier & Neustadt, L.L.P.

(57) ABSTRACT

A driving force control apparatus includes a driver model which is a functional block adjusting characteristics relevant to human senses and a powertrain manger which is a functional block adjusting vehicle's hardware characteristics. The driver model includes a target base driving force calculation unit (static characteristics) calculating a target driving force from an accelerator pedal position using a base driving force map or the like, and a target transient characteristics addition unit calculating a final target driving force from the target driving force using transient characteristics represented by a transfer function. The powertrain manager includes a target engine torque and AT gear calculation unit and a characteristics compensator compensating for response of the vehicle.

24 Claims, 3 Drawing Sheets

F I G. 4
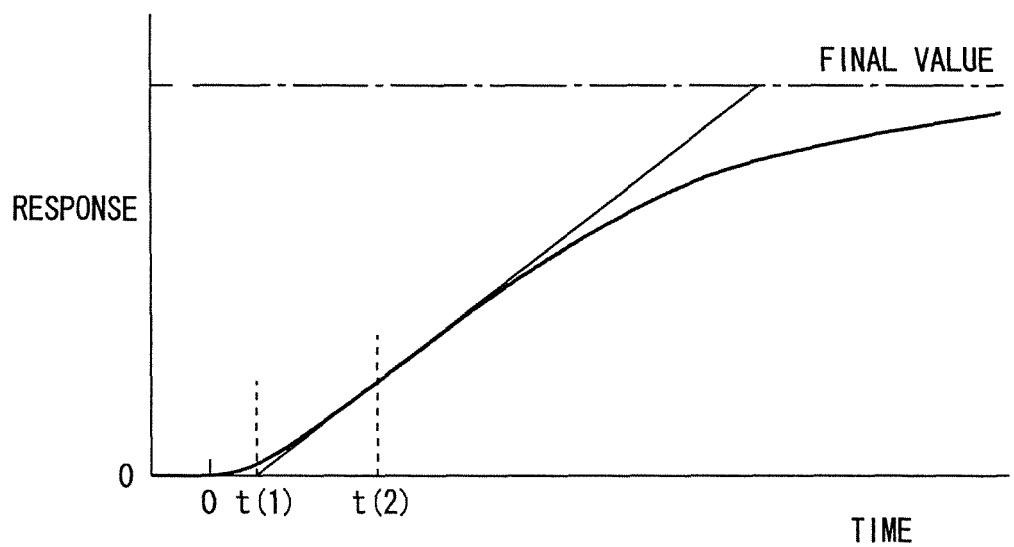

DRIVING FORCE CONTROLLER OF VEHICLE

TECHNICAL FIELD

The present invention relates to a control apparatus for a vehicle on which mounted a powertrain that includes an engine and an automatic transmission. In particular, the invention relates to a driving force control apparatus with which a driving force corresponding to a driving force requested by a driver can be output.

BACKGROUND ART

To a vehicle having an engine and an automatic transmission with which an engine output torque can be controlled independently of operation of the accelerator pedal by a driver, the concept "driving force control" may be applied. According to this concept, positive and negative target driving torques, which are calculated based on for example the degree to which the accelerator pedal is operated by the driver and operating conditions of the vehicle, are accomplished by using the engine torque and the gear ratio of the automatic transmission. Such control methods as those called "driving force request type" and "driving force demand type" are also classified into the above-described concept.

With this driving force control, a target driving torque can be determined to easily change dynamic characteristics of the vehicle. Under acceleration/deceleration (transient response), however, not only an inertia torque relevant to a change of the gear ratio of the automatic transmission with respect to time but also an inertia torque relevant to a change of the wheel speed with respect to time causes the driving torque to deviate from the target value. Thus, the torque has to be corrected.

Further, in the case where how the gear ratio should be changed is determined based on a transmission map using the throttle opening position and the vehicle speed, the following problems arise. If the driving source of the vehicle is an engine, a generated torque is increased as the throttle is opened to an increased degree. Therefore, in the case where the driver operates the vehicle to increase the requested driving force, the driving force can be increased in principle by increasing the degree to which the throttle is opened. However, the resultant characteristics are as follows. When the throttle is opened to a certain degree, the driving force generated from the engine is saturated, which means that even if the throttle is opened to a greater degree, the driving force is changed to only a small degree (driving force is not increased) (means that the characteristics are not linear but non-linear). Therefore, in the state where a relatively great driving force is generated from the engine, if the driving force request is made to slightly increase the driving force, the throttle opening position is changed to a large degree. Thus, the throttle opening position is changed to a large degree so that the gear ratio is changed to cross the gear-change line on the transmission map. In this case, there is a deviation between the target driving torque and the generated torque and thus the vehicle behavior intended by the driver is not implemented.

Japanese Patent Laying-Open No. 2002-087117 discloses a driving force control apparatus using a control specification that realizes a steady-state desired value for the driving force as well as a transient-state desired value for the driving force by way of tune control of the engine torque and the gear ratio, and accordingly a driving force as requested by the driver can be achieved and the power performance and the drivability can remarkably be improved.

The driving force control apparatus disclosed in the aforementioned publication, with a powertrain including an engine and a transmission, includes accelerator manipulated variable detection means for detecting a manipulated variable of an accelerator, vehicle speed detection means for detecting a vehicle speed, desired driving force calculation means for calculating a static desired driving force based on the detected manipulated variable of the accelerator and the detected vehicle speed, driving-force pattern calculation means for calculating a desired driving-force change pattern, steady-state desired value calculation means for calculating a steady-state desired engine torque value based on the desired driving force and calculating a steady-state desired gear ratio based on the detected manipulated variable of the accelerator and the detected vehicle speed, transient-state desired value calculation means for calculating a transient-state desired engine torque value and a transient-state desired gear ratio, based on the desired driving-force change pattern, desired engine torque realization means for realizing the steady-state desired engine torque value as well as the transient-state desired engine torque value, and desired gear ratio realization means for realizing the steady-state desired gear ratio as well as the transient-state desired gear ratio.

With this driving force control apparatus, while the vehicle is running, the desired driving force calculation means calculates the static-state desired driving force based on the manipulated valuable of the accelerator detected by the accelerator manipulated variable detection means and the vehicle speed detected by the vehicle speed detection means, and the driving force pattern calculation means calculates the desired driving force change pattern. The steady-state desired value calculation means calculates the steady-state desired engine torque value based on the desired driving force and calculates the steady-state desired gear ratio based on the detected accelerator manipulated variable and the detected vehicle state, the transient-state desired value calculation means calculates the transient-state desired engine torque value and the transient-state desired gear ratio based on the desired driving force change pattern. Then, the desired engine torque realization means realizes the steady-state desired engine torque value and the transient-state desired engine torque value, and the desired gear ratio realization means realizes the steady-state desired gear ratio and the transient-state desired gear ratio. In other words, the inertia torque generated resulting from delay in gear shift of the transmission and change in rotational speed is not entirely compensated for by the engine torque. Instead, the control specification is provided to achieve the steady-state desired value for the driving force and the transient-state desired value for the driving force by way of tune-control of the engine torque and the gear ratio. Thus, the driving force as requested by the driver can be accomplished and the power performance and the drivability can remarkably be improved.

The driving force control apparatus disclosed in Japanese Patent Laying-Open No. 2002-087117, however, calculates the static-state desired driving force based on the accelerator manipulated variable determined by operation by the driver, and transient characteristics are calculated based on the desired driving force change pattern together with a delay occurring in each component of the vehicle, so as to determine the desired driving force. Therefore, regarding this calculation, operation by the driver and characteristics of each component of the vehicle (delay characteristics) are associated with each other. Thus, it is indispensable, for achieving perceived acceleration or perceived deceleration sensed as desired by the driver, to stably implement transient characteristics of the acceleration of the vehicle.

The driving force control apparatus disclosed in the aforementioned publication cannot solve the following problems:

1) difficulty of adaptation based on characteristics of the driver, since operation by the driver and characteristics of each component of the vehicle (delay characteristics) are associated with each other; and 2) difficulty in implementing a desired driving force requested by the driver, because of the considerable non-linearity of such dynamic characteristics change (transient characteristics change) as delay characteristics of each vehicle component.

DISCLOSURE OF THE INVENTION

The present invention has been made to solve the above-described problems. An object of the invention is to provide a driving force control apparatus for a vehicle with which a driving force that can be sensed as desired by the driver can be achieved by easy adaptation.

A driving force control apparatus for a vehicle according to the present invention controls the driving force of the vehicle having a power source and a transmission connected to the power source. The driving force control apparatus includes: a target driving force setting unit setting a target driving force based on operation by a driver; and a control unit controlling the power source and the transmission based on the target driving force that is output from the target driving force setting unit. The control unit includes a compensation unit compensating for transient characteristics of the power source.

In accordance with the first invention, there are separately provided the target driving force setting unit which is a functional block setting the target driving force based on transient characteristics as desired by the driver in relation to operation by the driver, and the control unit which is a functional block controlling the power source and the transmission based on the set target driving force. The control unit includes the compensation unit functioning to compensate for transient characteristics of the power source so as to generate, according to the input target driving force, driver's desired acceleration of the vehicle without influenced by vehicle's hardware characteristics. The separate functional blocks respectively implement: setting the final target driving force by the target driving force setting unit so that driver's desired transient characteristics are obtained; and compensating for dynamic characteristics of the vehicle by the control unit. In this way, easy adaptation can be made with which the final target driving force can be set according to driver's senses and the operation performance required of the vehicle. Further, in order that such transient characteristics for the final target driving force can be generated, the compensation unit compensates for vehicle's hardware characteristics. Therefore, a desired vehicle acceleration can be generated. Accordingly, the driving force control apparatus for the vehicle can be provided with which a driving force sensed as desired by the driver can be generated.

Preferably, the target driving force setting unit includes: setting unit setting a target driving force based on operation by the driver; and a transient characteristics addition unit setting a final target driving force by adding the transient characteristics to the target driving force as set. The set final target driving force is output to the control unit.

In accordance with the present invention, adaptation to the driver's senses or the operation performance that is required of the vehicle is facilitated by using for example the transient characteristics represented by a response characteristic in a time region or a transfer function (second-order lag+dead time) in a time region.

Still preferably, the transient characteristics addition unit sets the final target driving force by using at least one of a response characteristic in a time region and a transfer function in a time region and adding the transient characteristics.

In accordance with the present invention, adaptation to the driver's senses or the operation performance that is required of the vehicle is facilitated by using the transient characteristics represented by a response characteristic in a time region or a transfer function (second-order lag+dead time) in a time region.

Still preferably, the transient characteristics addition unit sets the final target driving force by adjusting the transient characteristics based on at least one of: senses of the driver; and operation performance that is required of the vehicle, and adding the adjusted transient characteristics.

In accordance with the present invention, adaptation of the transient characteristics to the driver's senses (desiring smooth acceleration, desiring direct acceleration) and the operation performance (family-car-like performance, sporty-car-like performance) can be facilitated.

Still preferably, the compensation unit is produced by using a characteristics model of acceleration of the vehicle generated with respect to output of the power source.

In accordance with the present invention, the characteristics model is employed using an input that is the throttle opening position of the engine which is an example of the power source and using an output that is the acceleration G of the vehicle. Therefore, the transient characteristics of the power source can be appropriately compensated for.

Still preferably, the compensation unit is produced by using an inverse function of a transfer function representing the characteristics model.

In accordance with the present invention, the inverse function of the transfer function is employed using an input that is the throttle opening position of the engine which is an example of the power source and using an output that is the acceleration G of the vehicle. Therefore, the transient characteristics of the power source can be appropriately compensated for.

Still preferably, a detection unit detecting vehicle operation information, and an adjustment unit adjusting the compensation unit based on the vehicle operation information as detected are further included.

In accordance with the present invention, based on the vehicle operation information including the speed of the engine which is an example of the power source, the turbine revolution number of the torque converter, the output shaft revolution number of the automatic transmission, and the vehicle speed for example, the compensation unit is adjusted by changing the characteristics model of the compensation unit. Therefore, the transient characteristics of the power source can be compensated for appropriately. Alternatively, based on such information as described above, the characteristics model or the transfer function of the characteristics model may be prepared for each operation region in advance and the characteristics model or the transfer function of the characteristics model may be changed as the operation region is changed, based on the detected vehicle operation state.

BRIEF DESCRIPTION OF THE DRAWINGS

FIGS. 2 to 4 each show an example of transient response.

BEST MODES FOR CARRYING OUT THE INVENTION

Figure 1:
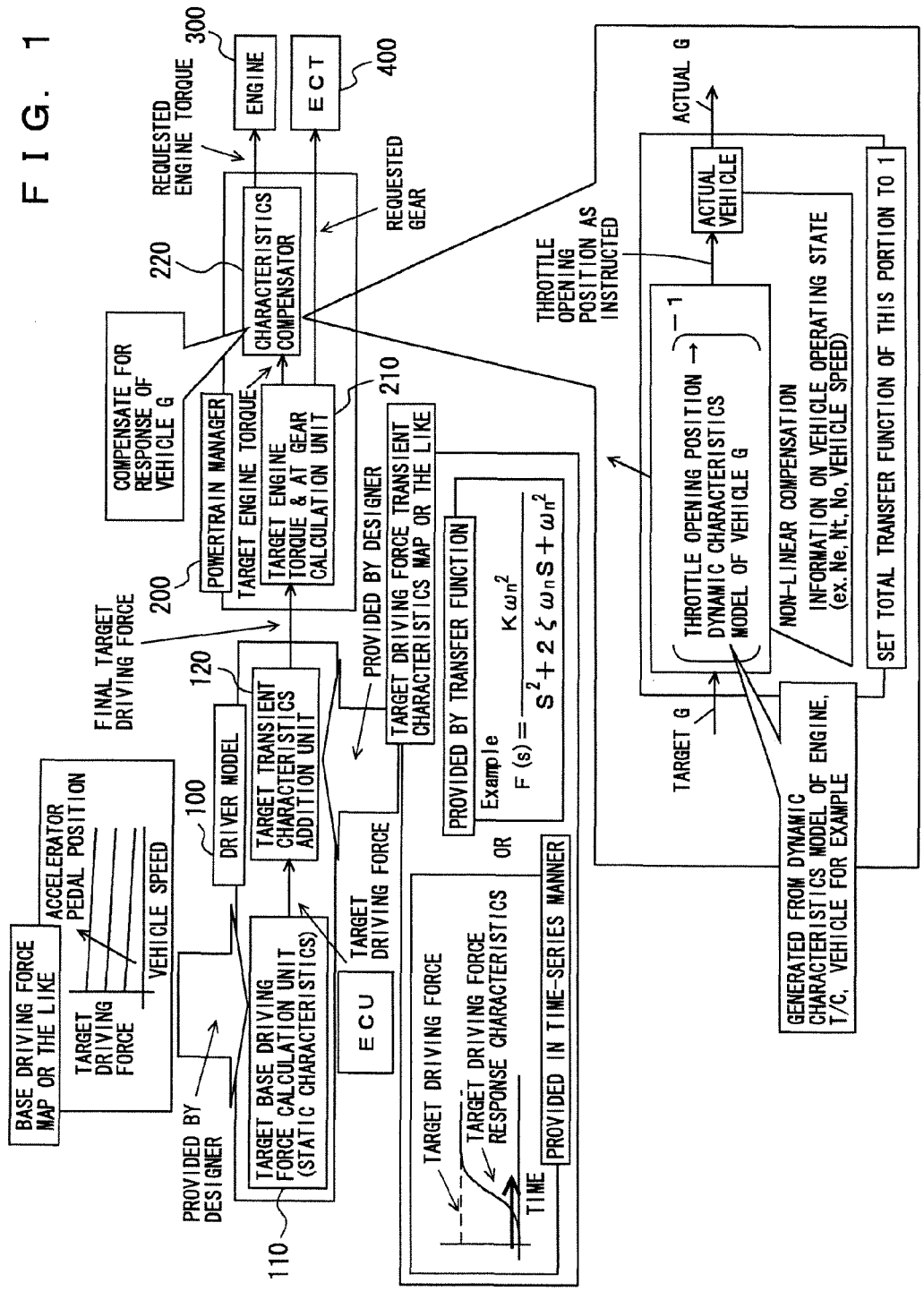
FIG. 1 is a block diagram showing an entire configuration of a control apparatus according to an embodiment of the present invention.

With reference to the drawings, embodiments of the present invention will be described hereinafter. In the following description, like components are denoted by like reference characters. They are named similarly and function similarly. Therefore, a detailed description thereof will not be repeated.

FIG. 1 shows a control block diagram of a driving force control apparatus according to the present embodiment. This driving force control apparatus is implemented by a program executed by a CPU (Central Processing Unit) included in an ECU (Electronic Control Unit) mounted on a vehicle.

As shown in FIG. 1, the driving force control apparatus finally outputs a requested engine torque to an engine 300 and outputs a requested gear to an ECT (Electronically Controlled automatic Transmission) 400. It is noted that ECT 400 may be a belt-type CVT (Continuously Variable Transmission). In this case, the output is not the requested gear but a requested gear ratio.

With reference to FIG. 1, a configuration of the driving force control apparatus of the present embodiment will be described in detail hereinafter. It is noted that the map, transfer function, coefficient and parameter as described below are exemplary ones, and the present invention is not limited to them.

This driving force control apparatus includes a driver model 100 and a powertrain manager 200. By a target transient characteristics addition unit 120 included in driver model 100, tuning is performed in terms of human senses, not in terms of hardware characteristics of the vehicle. By a characteristics compensator 220 included in powertrain manager 200, tuning is performed in terms of vehicle hardware characteristics, not in terms of human senses. A feature is that human senses and vehicle hardware characteristics are processed separately. Another feature is that tuning of transient characteristics resultant from non-linearity of hardware characteristics of the vehicle is facilitated. Concerning the driving force control apparatus, driver model 100 and powertrain manager 200 are now described in this order together with these features.

As shown in FIG. 1, driver model 100 includes a target base driving force calculation unit (static characteristics) 110, and target transient characteristics load calculation unit 120 calculating a final target driving force based on a target driving force that is output from target base driving force calculation unit (static characteristics) 110.

Target base driving force calculation unit (static characteristics) 110 calculates a target driving force based on a map with which the target driving force is determined by a vehicle speed with respect to an accelerator pedal position used as a parameter, as shown in BASE DRIVING FORCE MAP OR THE LIKE in FIG. 1 for example. In other words, target base driving force calculation unit (static characteristics) 110 calculates the target driving force from the accelerator pedal position determined by operation by the driver and the speed of the vehicle (vehicle speed) at this time.

Target transient characteristics load calculation unit 120 is a unit, which is a characteristic component of the present invention as described above, performing a computation for determining what transient characteristics are to be provided, in terms of human senses (separately from hardware characteristics of the vehicle). Target transient characteristics load calculation unit 120 is provided in the time-series manner or in the form of a transfer function (second-order lag+dead time) as shown for example in "TARGET DRIVING FORCE TRANSIENT CHARACTERISTICS MAP OR THE LIKE" in FIG. 1. Since target transient characteristics load calculation unit 120 is provided in the time-series manner or in the form of the transfer function as described above, (on the precondition that a characteristics compensator described hereinlater operates normally,) a target response in the TARGET DRIVING FORCE TRANSIENT CHARACTERISTICS MAP can be adjusted to tune (customize) vehicle acceleration characteristics (static characteristics and dynamic characteristics) with respect to the accelerator pedal position, without depending on hardware characteristics of the vehicle. In the following, a description will be given of the case where "TARGET DRIVING FORCE TRANSIENT CHARACTERISTICS MAP OR THE LIKE" is provided in the form of a transfer function.

The transfer function as shown in FIG. 1 is an example configured with a second-order lag element and a dead time element as described above. It is supposed that a change of the target driving force is a stepwise change (for example in the case where the accelerator pedal is depressed in a stepwise manner). Then, in a time region, the transfer function provides a transient response of a second-order lag system. In this respect, it can also be understood that a filter of the second-order lag system is provided with respect to a requested driving force.

Figure 2:
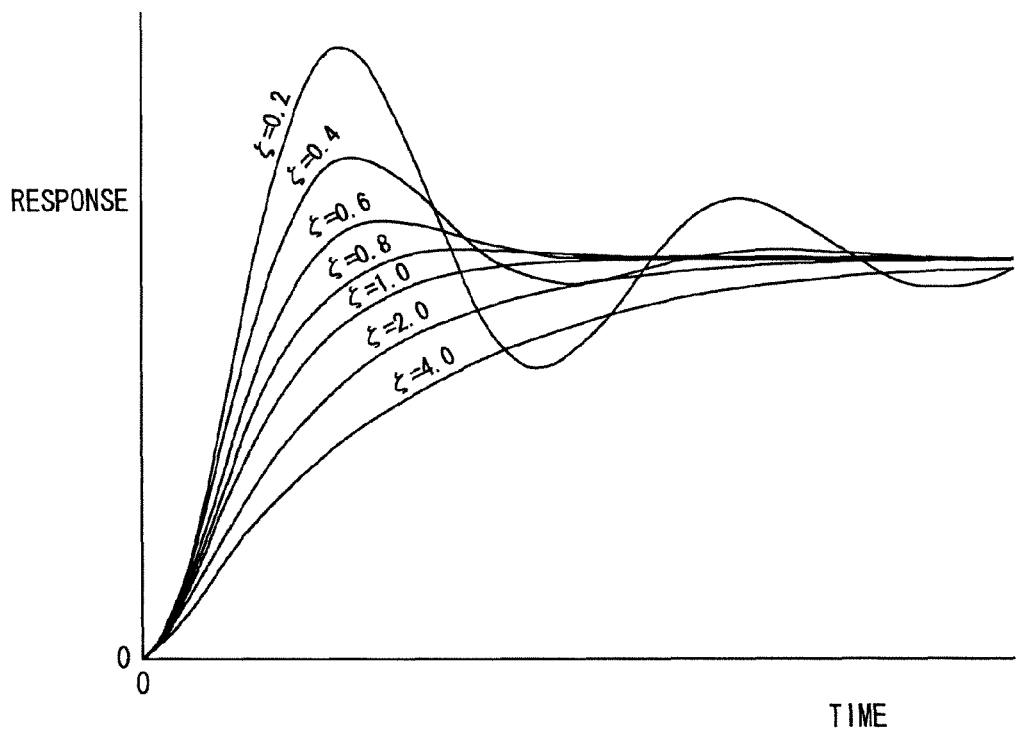

A specific example of actual adjustment (tuning) is as follows. A parameter ωn and a parameter $\zeta$ of the aforementioned transfer function are tuned. FIG. 2 shows a waveform of the step response of the transfer function. When the parameter $\zeta$ is in the range of $0<\zeta<1$ (underdamped), an overshoot is generated and, as the parameter $\zeta$ is smaller, oscillation is greater. When the parameter $\zeta$ is larger than 1, namely $\zeta>1$ (overdamped), no oscillation occurs and, as parameter $\zeta$ is larger, the target value is more gradually approached. When the parameter $\zeta$ is equal to 1, namely $\zeta=1$ (critically damped), the target value is reached without oscillation.

Figure 3:
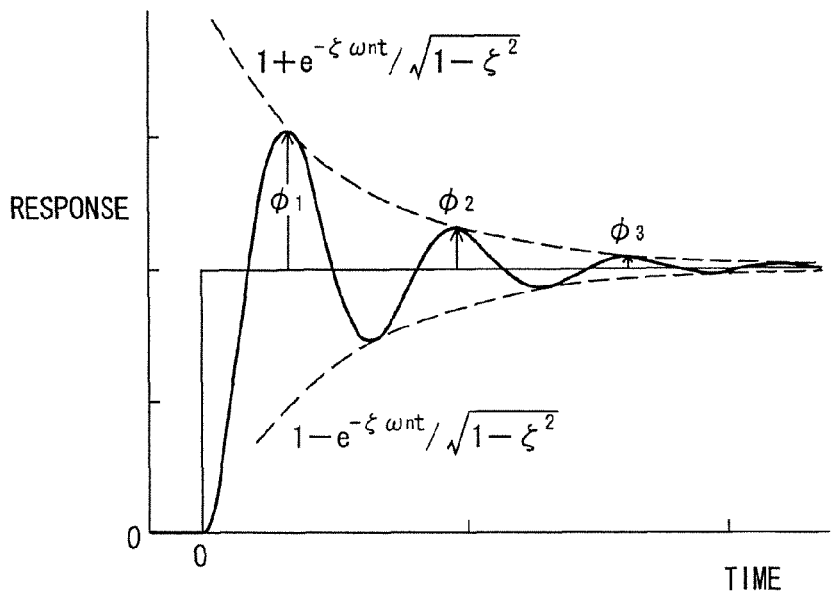

FIG. 3 shows overshoot Φ in the case of $0<\zeta<1$ (underdamped). As shown in FIG. 3, in the underdamped case, oscillation occurs with repeated overshoot and undershoot. Therefore, in actual, the parameter $\zeta$ cannot be set in this range of $0<\zeta<1$ (underdamped). Then, for the parameter $\zeta$, tuning is performed based on the following principles.

In the case where the driver desires that the perceived acceleration change is smooth, or in the case where tuning appropriate for the family car and the like which is a concept of the vehicle is desired, the parameter $\zeta$ (>1) is adjusted to be larger. Namely, a gradual rise is implemented like the one implemented by $\zeta=2.0$ or $\zeta=4.0$ in FIG. 2.

In contrast, in the case where the driver desires that the perceived acceleration change is direct, or in the case where tuning appropriate for the sporty car and the like which is a concept of the vehicle is desired, the parameter $\zeta$ is adjusted to a value that is as close as possible to 1 while larger than 1, namely to a value close to 1 with the limit of $\zeta=1.0$ in FIG. 2. A quick rise can be implemented like the one implemented by $\zeta=1.0$.

Next, tuning of the parameter ωn is described. In the step response of the second-order lag system shown in FIG. 4, the parameter ωn influences the shape of the response curve extending to the inflection point at the time t (2). In the case where the parameter $\zeta$ is 1, as parameter ωn is increased, the aforementioned shape of the response curve immediately becomes linear. As the parameter ωn is decreased, the shape of the response curve becomes gradually (initially rounded) linear. Accordingly, the parameter ωn is tuned based on the following principles.

In the case where the driver desires that the perceived acceleration change is smooth, or in the case where tuning appropriate for the family car and the like which is a concept of the vehicle is desired, the parameter ωn is adjusted to be smaller. In other words, a gradual rise with a rounded portion near the inflection point in FIG. 4 is implemented.

In contrast, in the case where the driver desires that the perceived acceleration change is direct, or in the case where tuning appropriate for the sporty car and the like which is a concept of the vehicle is desired, the parameter ωn is adjusted to be larger. In other words, a quick rise without rounded portion near the inflection point in FIG. 4 is implemented.

Thus, in the case where the driver desires that the perceived acceleration change is smooth, or in the case where tuning appropriate for the family car and the like which is a concept of the vehicle is desired, the parameter $\zeta$ (>1) is adjusted to be larger while the parameter ωn is adjusted to be smaller. In the case where the driver desires that the perceived acceleration change is direct, or in the case where tuning appropriate for the sporty car and the like which is a concept of the vehicle is desired, the parameter $\zeta$ (>1) is adjusted to be as close as possible to 1 while the parameter ωn is adjusted to be larger. It is noted that these parameters and the method of adjusting the parameters are exemplary ones, and the present invention is not limited to them.

As discussed above, by using the transfer function as shown in FIG. 1 to provide target driving force transient characteristics, a designer can easily implement tuning that can readily be adapted to the senses of the driver or the concept of the vehicle. Thus, characteristics compensator 220 of powertrain manager 200 which is described hereinlater is used to configure a compensator relevant to hardware characteristics (particularly non-linear characteristics) of the vehicle, while driver model 100 can adjust only those factors that influence the human senses and that do not influence such hardware characteristics of the vehicle as described above, separately from the hardware characteristics of the vehicle.

Powertrain manager 200 includes a target engine torque & AT gear calculation unit 210, and characteristics compensator 220 calculating a requested engine torque based on a target engine torque that is output from target engine torque & AT gear calculation unit 210. Characteristics compensator 220 compensates for an element that is response of a vehicle G, namely acceleration generating for the vehicle, and that depends on hardware characteristics of the vehicle.

Characteristics compensator 220 is a characteristic component of the present invention, and is designed based on an inverse function of a transfer function from the engine throttle opening position to the vehicle acceleration determined by identifying an actual vehicle or a detailed simulation model for an element that is hardware characteristics of the vehicle and that exhibits a particularly marked non-linearity, separately from human senses. With this structure, accelerator pedal position—vehicle acceleration characteristics (static characteristics, dynamic characteristics) can be kept constant without considerably influenced by hardware characteristics of the vehicle. Thus, in combination with target transient characteristics load calculation unit 120 as described above, highly satisfactory acceleration characteristics can be provided to the user.

Further, as shown in FIG. 1, characteristics compensator 220 is designed to provide a total transfer function G(s) from a target G (target engine torque) to an actual G (requested engine torque) (including the inverse function of the dynamic—characteristics model of throttle opening position →vehicle G) as "G(s)=1." Thus, in a high-frequency region as well (in the case where the accelerator pedal position is suddenly changed), satisfactory response can be maintained. It is noted that the dynamic-characteristics model of throttle opening position →vehicle G is generated based on a dynamic-characteristics model of an engine, a torque converter and the vehicle.

It is noted that, regarding this total transfer function G(s), the operating region may be divided into a plurality of regions and partial linearization may be provided in each region for example, so as to allow an inverse function of the dynamic—characteristics model of throttle opening position →vehicle G to be calculated. Further, characteristics compensator 220 may change or switch characteristics according to vehicle operating-state information (engine speed Ne, turbine revolution number Nt, output shaft revolution number No, vehicle speed). Thus, an effect of changing the dynamic-characteristics model itself is obtained.

As shown in FIG. 1, target transient characteristics addition unit 120 is provided to precede powertrain manager 200 and this powertrain manager 200 is provided as a functional block separate from target transient characteristics addition unit 120. Target transient characteristics addition unit 120 is configured as a functional block that processes only an element relevant to human senses, while powertrain manager 200 is configured to process only an element depending on hardware characteristics of the vehicle.

In this way, the driving force control apparatus of the present embodiment is configured to separately have a functional block that influences human senses or senses relevant to the concept of the vehicle (target transient characteristics addition unit) and a functional block that influences hardware characteristics of the vehicle (characteristics compensator). The target transient characteristics addition unit represents the transfer function from a target driving force to a final target driving force by a transfer function that can easily be tuned by a designer in terms of senses, for example, a transfer function of a second-order lag system+dead time. Thus, it is facilitated to adjust transient characteristics in a time region such as rise characteristics for example starting from stepwise depression of the accelerator pedal. The characteristics compensator defines, the total transfer function G(s) including an inverse function of the dynamic-characteristics model from the throttle opening to the vehicle G, as G(s)=1. Accordingly, the requested engine torque can be calculated from the target engine torque while the non-linearity is eliminated. Consequently, a designer can easily perform tuning in terms of human senses and hardware characteristics can be compensated for regardless of hardware characteristics of the vehicle having non-linear control characteristics.

It should be construed that embodiments are herein disclosed by way of illustration in all respects, not by way of limitation. It is intended that the scope of the present invention is defined by claims, not by the description above, and includes all modifications equivalent in scope and meaning to the claims.

The invention claimed is:

1. A driving force control apparatus for a vehicle having a power source and a transmission connected to said power source, comprising:
   a target driving force setting unit setting a target driving force based on an actual operation and a desired operation of the vehicle by a driver; and
   a control unit controlling said power source and said transmission based on the target driving force output from said target driving force setting unit, wherein said control unit includes a compensation unit compensating for vehicle transient characteristics of said power source and hardware characteristics of the vehicle, said target driving force setting unit includes:

a setting unit setting an initial target driving force based on vehicle speed and an accelerator pedal position, and a transient characteristics addition unit setting a final target driving force by adding target driving force transient characteristics based on the desired operation to said initial target driving force set by the setting unit, by a time-series manner or a transfer function provided in advance, said final target driving force is output to said control unit, and said time-series manner or said transfer function includes a parameter for adjusting the transient characteristics of said target driving force separately from said hardware characteristics of the vehicle.

2. The driving force control apparatus for the vehicle according to claim 1, wherein said transient characteristics addition unit sets the final target driving force by using at least one of a response characteristic in a time region and a transfer function in a time region and adding said target driving force transient characteristics.

3. The driving force control apparatus for the vehicle according to claim 2, further comprising:

a detection unit detecting vehicle operation information; and an adjustment unit adjusting said compensation unit based on said vehicle operation information as detected.

4. The driving force control apparatus for the vehicle according to claim 1, wherein said compensation unit is produced by using a characteristics model of acceleration of the vehicle generated with respect to output of the power source.

5. The driving force control apparatus for the vehicle according to claim 4, wherein said compensation unit is produced by using an inverse function of a transfer function representing said characteristics model.

6. The driving force control apparatus for the vehicle according to claim 4, further comprising:

a detection unit detecting vehicle operation information; and an adjustment unit adjusting said compensation unit based on said vehicle operation information as detected.

7. The driving force control apparatus for the vehicle according to claim 1, further comprising:

a detection unit detecting vehicle operation information; and an adjustment unit adjusting said compensation unit based on said vehicle operation information as detected.

8. The driving force control apparatus according to claim 1, wherein said transient characteristics addition unit adjusts said target driving force transient characteristics that reflect at least one of perceived acceleration required by the driver and operation performance of the vehicle required by the driver, separately from the hardware characteristics of the vehicle.

9. The driving force control apparatus according to claim 1, wherein the target driving force transient characteristics include a type of acceleration desired by the driver and an operation performance required of the vehicle.

10. The driving force control apparatus according to claim 1, wherein the target driving force transient characteristics addition unit sets the final target driving force in a time-series manner or by a transfer function provided in advance.

11. The driving force control apparatus according to claim 1, wherein said control unit:

sets a target torque for said power source and a gear for said transmission, outputs said set gear to said transmission, outputs said target torque to said compensation unit, where said target torque is adjusted to a requested torque based on said vehicle transient characteristics, and outputs said requested torque to said power source.

12. The driving force control apparatus for the vehicle according to claim 1, wherein said hardware characteristics include non-linear characteristics of a relationship between engine throttle opening position and vehicle acceleration.

13. A driving force control apparatus for a vehicle having a power source and a transmission connected to said power source, comprising:

target driving force setting means for setting a target driving force based on an actual operation and a desired operation of the vehicle by a driver; and control means for controlling said power source and said transmission based on the target driving force output from said target driving force setting means, wherein said control means includes compensation means for compensating for vehicle transient characteristics of said power source and hardware characteristics of the vehicle, said target driving force setting means includes:

means for setting an initial target driving force based on vehicle speed and an accelerator pedal position, and transient characteristics addition means for setting a final target driving force by adding target driving force transient characteristics based on the desired operation to said initial target driving force set by the means for setting, by a time-series manner or a transfer function provided in advance, said final target driving force is output to said control means, and said time-series manner or said transfer function includes a parameter for adjusting the transient characteristics of said target driving force separately said hardware characteristics of the vehicle.

14. The driving force control apparatus for the vehicle according to claim 13, wherein said transient characteristics addition means sets the final target driving force by using at least one of a response characteristic in a time region and a transfer function in a time region and adding said target driving force transient characteristics.

15. The driving force control apparatus for the vehicle according to claim 14, further comprising:

means for detecting vehicle operation information; and means for adjusting said compensation means based on said vehicle operation information as detected.

16. The driving force control apparatus for the vehicle according to claim 13, wherein said compensation means is produced by using a characteristics model of acceleration of the vehicle generated with respect to output of the power source.

17. The driving force control apparatus for the vehicle according to claim 16, wherein said compensation means is produced by using an inverse function of a transfer function representing said characteristics model.

18. The driving force control apparatus for the vehicle according to claim 16, further comprising:
means for detecting vehicle operation information; and
means for adjusting said compensation means based on said vehicle operation information as detected.

19. The driving force control apparatus for the vehicle according to claim 13, further comprising:
means for detecting vehicle operation information; and
means for adjusting said compensation means based on said vehicle operation information as detected.

20. The driving force control apparatus for the vehicle according to claim 13, wherein
said transient characteristics addition means adjusts said target driving force transient characteristics that reflect at least one of perceived acceleration required by the driver and operation performance of the vehicle required by the driver, separately from the hardware characteristics of the vehicle.

21. The driving force control apparatus according to claim 13, wherein the target driving force transient characteristics include a type of acceleration desired by the driver and an operation performance required of the vehicle.

22. The driving force control apparatus according to claim 13, wherein the target driving force transient characteristics addition means sets the final target driving force in a time-series manner or by a transfer function provided in advance.

23. The driving force control apparatus according to claim 13, wherein said control means:
sets a target torque for said power source and a gear for said transmission,
outputs said set gear to said transmission,
outputs said target torque to said compensation means, where said target torque is adjusted to a requested torque based on said vehicle transient characteristics, and
outputs said requested torque to said power source.

24. The driving force control apparatus for the vehicle according to claim 13, wherein said hardware characteristics include non-linear characteristics of a relationship between engine throttle opening position and vehicle acceleration.

* * * * *